Dec. 22, 1953

S. ROSIN ET AL 2,663,222

THREE-ELEMENT OBJECTIVE LENS WITH REDUCED
SPHERICAL ABERRATION AND CHROMATIC
DIFFERENCE OF SPHERICAL ABERRATION

Filed Feb. 23, 1951

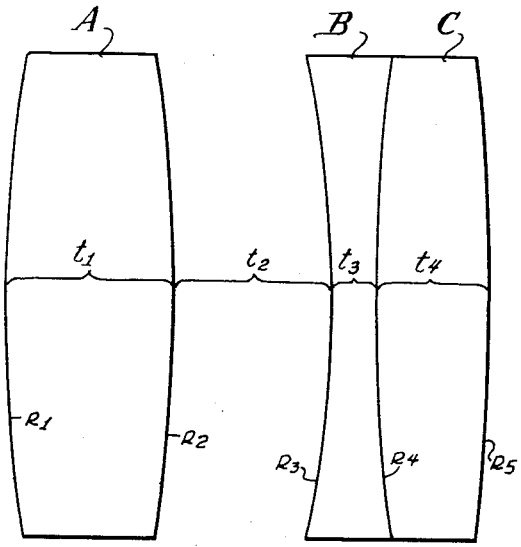

Fig. 1.

Fig. 2.

EFFECTIVE FOCAL LENGTH: 374.5 millimeters
BACK FOCAL LENGTH: 313.1 millimeters
APERTURE: F6

| ELEMENT | N | V | RADII | THICKNESSES |
|---------|-------|------|------------------|------------------|
| A | 1.530 | 51.8 | $R_1 = +199.0$ mm | $t_1 = 23.25$ mm |
|   |       |      | $R_2 = -206.3$ " | $t_2 = 21.14$ " |
| B | 1.689 | 30.9 | $R_3 = -151.8$ " | $t_3 = 6.06$ " |
|   |       |      | $R_4 = +560.5$ " |                  |
| C | 1.530 | 51.8 | $R_4 = +560.5$ " | $t_4 = 15.64$ " |
|   |       |      | $R_5 = -269.4$ " |                  |

INVENTORS:
SEYMOUR ROSIN
ANGELA M. BOTTALICO
BY
Pennie, Edmonds, Morton, Barrows and Taylor
ATTORNEYS Patented Dec. 22, 1953

2,663,222

UNITED STATES PATENT OFFICE 2,663,222

THREE-ELEMENT OBJECTIVE LENS WITH REDUCED SPHERICAL ABERRATION AND CHROMATIC DIFFERENCE OF SPHERICAL ABERRATION

Seymour Rosin and Angela M. Bottalico, New York, N. Y., assignors to Farrand Optical Co., Inc., New York, N. Y., a corporation of New York Application February 23, 1951, Serial No. 212,248

5 Claims. (Cl. 88—57)

This invention relates to three-element objective lenses which are for use in highly corrected systems and which include a simple front double convex element and a rear cemented doublet. The invention provides objectives of this form having a high degree of correction for spherical aberration and chromatic difference of spherical aberration, not only for marginal rays but also for intermediate rays.

In objectives hitherto employed for the same general purpose the zonal spherical and zonal chromatic difference of spherical aberration have been severe because of the strong curvature given to the cemented surface of the doublet for the correction of primary spherical aberration, i. e. that of marginal rays, introduced at the other surfaces. Such a strong curvature has been required in view of the low index change at the cemented interface. With such strong curvature the spherical aberration and chromatic difference of spherical aberration at the cemented surface have been weaker for intermediate rays than the corresponding aberrations for such rays at other surfaces and have left the lens with severe aberrations of these categories for such intermediate rays.

According to the present invention the correction of primary spherical aberration is transferred from the cemented surface (the fourth, counting from the front of the lens) to the third surface. To this end the third surface is made concave toward the front element rather than convex as has been customary heretofore. With this sign of curvature even a relatively weak curvature of the third surface makes it overcorrecting for marginal rays to the extent required to correct the spherical aberration (undercorrection) introduced for those rays at the other surfaces. This is so because the high power of the front element brings such rays to strike the third surface at high angles of incidence in spite of the weak curvature of the third surface.

The fourth surface, at the interface between the two elements of the doublet, can then be left a rather weak one. It will moreover be nearly normal to the axial rays in view of the sign of its curvature (convex toward the object).

The correction of the secondary aberrations is achieved by adjusting the spacing between the positive singlet component and the doublet, and by suitably apportioning the positive power between the singlet and the double convex element of the doublet.

Such adjustment of spacing and of the power of the singlet affects, among other things, the height of intersection and incidence of the marginal rays at the third surface. Combinations of such height of intersection and incidence are available which will correct the aberrations of the marginal rays with curvatures for the third surface which do not correct the intermediate rays to an insufficient extent.

The characteristics of the lens which measure its adherence to this standard are the ratio of the surface refracting power of the first element (computed as the sum of the refracting powers of its two surfaces) to the refracting power of the objective, and the ratio of the axial separation of the two components to the focal length of the lens. The first of these ratios will hereinafter be denoted $\mu$ and the second $\eta$. The ratios $\mu$ and $\eta$ each govern both the angle of incidence with which rays strike the double concave element of the doublet, and the altitude at which such incidence takes place. Of course the two factors do not operate independently of each other. For satisfactory performance these quantities should lie between the limits $$1.75 < \mu < 2.5$$

and $$.035 < \eta < .1$$

By suitably selecting values for $\mu$ and $\eta$ according to methods known to those skilled in the art, the angle of incidence and height of intersection for marginal rays at the surface of the double concave element facing the singlet may be so chosen as to eliminate their spherical aberration and at the same time permit radii of curvature for this surface which will greatly reduce the spherical aberration and chromatic difference of spherical aberration for the intermediate rays.

Lenses according to the invention are intended to be used for imaging distant objects, the object field being usually not more than some 14°. With the characteristics above noted the lens of the invention has such small zonal spherical aberration and zonal chromatic difference of spherical aberration that it may easily be corrected within the Rayleigh limit for reasonable focal lengths.

The general form of the lens is shown in Fig. 1 of the accompanying drawings, which shows in diagrammatic section an objective according to a preferred form of the invention. Fig. 2 gives data for the objective of Fig. 1.

In Fig. 1 element A, which faces the object, and element C, which faces the image both have a lower index and lower dispersion (higher Abbé number V) than the intermediate double-concave element B, which is the dispersive element of the lens. In glass lenses elements A and C are crown while B is flint. Elements B and C are cemented together at a surface relatively weak in the production of primary spherical abberation. Angles of incidence of axial rays upon this surface are in general rather small.

The front element A, which provides the positive power of the lens, has almost twice the power of the entire lens, and its first surface 1 is more strongly curved than its second surface 2. Element A is also the thickest axially of the three, followed by elements C and B in that order. Likewise the spacing of the element A and the doublet comprising elements B and C is greater than the thickness of either B or C. The dispersive element B has its first surface 3 more strongly curved than the second surface 2 of element A.

Three examples of lenses according to the invention will now be given.

Example 1

This is the lens of Figs. 1 and 2, and the data of Fig. 2 is here reproduced for convenience.

| | Millimeters |
|---|---|
| Effective focal length | 374.5 |
| Back focal length | 313.1 |
| Aperture F6. | |

Elements A and C are of crown and B is of flint glass. The refractive indices and Abbé numbers of these elements are as follows:

| Element | Index | Abbé Number |
|---|---|---|
| A | 1.530 | 51.8 |
| B | 1.689 | 30.9 |
| C | 1.530 | 51.8 |

The radii of the various faces are:

$R_1$=199.0 mm.    $R_4$=560.5 mm.
$R_2$=−206.3 mm.   $R_5$=−269.4 mm.
$R_3$=−151.8 mm.

The thicknesses of the elements and of the air space are:

$t_1$=23.25 mm.    $t_3$=6.06 mm.
$t_2$=21.14 mm.    $t_4$=15.64 mm.

This is a lens for the visible region. With a focal length of 374.5 millimeters its power is 2.67 diopters, and the surface refracting power of the first element sums to 5.23 diopters. Therefore in this design the ratio $\mu$ is of the value 1.96, and the ratio $\eta$ is of the value 0.0565.

Example 2

| | Millimeters |
|---|---|
| Effective focal length | 299.3 |
| Back focal length | 245.3 |

In this lens elements A and C are of lithium fluoride and element B is of crystal quartz. The refractive indices and Abbé numbers are as follows:

| Element | Index | Abbé Number |
|---|---|---|
| A | 1.398 | 13.4 |
| B | 1.557 | 8.66 |
| C | 1.398 | 13.4 |

The radii of the various faces are:

$R_1$=94.76 mm.    $R_4$=131.1 mm.
$R_2$=−112.4 mm.   $R_5$=−144.4 mm.
$R_3$=−89.82 mm.

The thicknesses of the elements and of the air space are:

$t_1$=16.4 mm.    $t_3$=4.3 mm.
$t_2$=15.4 mm.    $t_4$=11.1 mm.

This is a lens for the visible and ultraviolet regions and may be operated at apertures down to F4. With a focal length of 300 millimeters the power of the lens is 3.33 diopters, and the surface refracting power of the first element sums to 7.62 diopters. Therefore $$\mu = 2.29$$

and $$\eta = 0.051$$

Example 3

| | Millimeters |
|---|---|
| Effective focal length | 497.5 |
| Back focal length | 394.7 |
| Aperture F8. | |

In this lens elements A and C are of crown and element B is of flint glass. The refractive indices and Abbé numbers of the elements are as follows:

| Element | Index | Abbé Number |
|---|---|---|
| A | 1.611 | 58.8 |
| B | 1.745 | 45.6 |
| C | 1.611 | 58.8 |

The radii of the various faces are:

$R_1$=178.4 mm.    $R_4$=86.28 mm.
$R_2$=−630.0 mm.   $R_5$=−2,398.0 mm.
$R_3$=−473.9 mm.

The thicknesses of the elements and of the air space are:

$t_1$=20.0 mm.    $t_3$=7.0 mm.
$t_2$=31.0 mm.    $t_4$=15.0 mm.

With a focal length of 497.5 millimeters the power of the lens is 2.01 diopters, and the surface refracting power of the first element sums to 4.39 diopters. Accordingly $$\mu = 2.19$$

and $$\eta = 0.062$$

In this lens the glasses have partial dispersions which are more nearly alike. Therefore the secondary spectrum is minimized.

All the examples lie within the limits of $\mu$ and $\eta$ established by the invention, and all further embody the features set forth in the description of the general form of the lens of the invention given above in connection with Fig. 1.

Lenses according to the invention have practically no zonal spherical nor zonal sphero-chromatism even for relatively high apertures.

We claim:

1. A three-element objective lens corrected for spherical aberration and chromatic difference of spherical aberration, said lens comprising a double convex crown singlet air-spaced from a cemented doublet including a double concave flint element adjacent the singlet and a double convex crown element, the surfaces of all of said elements having finite radii of curvature, the ratio of the sum of the surface refracting powers of the surfaces of the singlet to the total refracting power of the lens lying between 1.75 and 2.5 and the ratio of the axial separation of the singlet and doublet to the focal length of the lens lying between .035 and .1.

2. An objective corrected for spherical aberration and chromatic difference of spherical aberration comprising a front singlet double convex crown element air-spaced from a cemented doublet including a double concave flint element adjacent the singlet and a double convex crown element, the surfaces of all of said elements having finite radii of curvature; said lens being characterized by the relations $1.75 < \mu < 2.5$ and $$.035 < \eta < .1$$

in which $\mu$ is the ratio of the surface refracting power of the singlet computed as the sum of its separate surface refracting powers to the total power of the objective and in which $\eta$ is the ratio of the axial separation of the singlet and doublet to the focal length of the objective.

3. An objective corrected for spherical aberration and chromatic difference of spherical aberration comprising a front singlet double convex element air-spaced from a rear cemented doublet including a double concave element adjacent the singlet and a double convex element remote from the singlet, the surfaces of all of said elements having finite radii of curvature; in which the refractive indices N of the elements and their Abbé numbers V both with lettered subscripts from front to rear, the radii R of the surfaces of the elements with numbered subscripts from front to rear, the ratio $\mu$ of the sum of the surface refracting powers of the singlet surfaces to the refracting power of the objective and the ratio $\eta$ of the axial separation between the singlet and doublet to the focal length of the objective conform to the following algebraic inequalities:

$$N_A < N_B$$
$$N_C < N_B$$
$$V_A > V_B$$
$$V_C > V_B$$
$$R_1 < R_2$$
$$R_3 < R_2$$
$$1.75 < \mu < 2.5$$
$$.035 < \eta < .1$$

4. An objective corrected for spherical aberration and for chromatic difference of spherical aberration comprising a front singlet double convex crown element air-spaced from a cemented doublet including a double concave flint element adjacent the singlet element and a double convex crown element, the surfaces of all of said elements having finite radii of curvature, said lens being characterized by the relations $1.75 < \mu < 2.5$ and $0.035 < \eta < 0.1$ in which $\mu$ is the ratio of the surface refracting power of the singlet element computed as the sum of its separate surface refracting powers to the total power of the objectives and in which $\eta$ is the ratio of the axial separation of the singlet and doublet to the focal length of the objective, said lens further having a back focal length between 75 and 85 per cent of its focal length.

5. An objective corrected for spherical aberration and for chromatic difference of spherical aberration and having a back focal length between 75 and 85 per cent of its focal length, said objective comprising a front singlet double convex element air-spaced from a rear cemented doublet including a double concave element adjacent the singlet and a double convex element remote from the singlet, the surfaces of all of said elements having finite radii of curvature; in which the refractive indices N of the elements and their Abbé numbers V both with lettered subscripts from front to rear, the radii R of the surfaces of the elements with numbered subscripts from front to rear, the ratio $\mu$ of the sum of the surface refracting powers of the singlet surfaces to the refracting power of the objective and the ratio $\eta$ of the axial separation between the singlet and doublet to the focal length of the objective conform to the following algebraic inequalities:

$$N_A < N_B$$
$$N_C < N_B$$
$$V_A > V_B$$
$$V_C > V_B$$
$$R_1 < R_2$$
$$R_3 < R_2$$
$$1.75 < \mu < 2.5$$
$$.035 < \eta < .1$$

SEYMOUR ROSIN.
ANGELA M. BOTTALICO.

References Cited in the file of this patent

UNITED STATES PATENTS

| Number | Name | Date |
|---|---|---|
| 554,737 | Schroeder | Feb. 18, 1896 |
| 682,017 | Aldis | Sept. 3, 1901 |
| 1,035,408 | Beck | Aug. 13, 1912 |
| 1,159,233 | Konig | Nov. 2, 1915 |
| 1,514,356 | Warmisham | Nov. 4, 1924 |

FOREIGN PATENTS

| Number | Country | Date |
|---|---|---|
| 7,661 | Great Britain | of 1906 |
| 189,255 | Germany | Sept. 30, 1907 |
| 309,085 | Great Britain | Apr. 10, 1930 |